United States Patent [19]

McCarty

[11] 4,334,160
[45] Jun. 8, 1982

[54] ROTATING ELECTRICAL MACHINE

[75] Inventor: Frederick B. McCarty, San Pedro, Calif.

[73] Assignee: The Garrett Corporation, Los Angeles, Calif.

[21] Appl. No.: 34,086

[22] Filed: Apr. 27, 1979

[51] Int. Cl.³ .............................................. H02K 9/08
[52] U.S. Cl. ..................................... 310/57; 310/156; 310/268
[58] Field of Search ............... 310/156, 154, 181, 268, 310/53, 57, 155, 152

[56] References Cited

U.S. PATENT DOCUMENTS

| 2,428,781 | 10/1947 | Bowlus | 310/268 |
| 3,320,454 | 5/1967 | Kober | 310/156 |
| 3,324,321 | 6/1967 | Kober | 310/156 |
| 3,445,691 | 5/1969 | Beyersdorf et al. | 310/268 X |
| 3,482,131 | 12/1969 | Lytle | 310/150 |
| 3,543,066 | 11/1970 | French | 310/57 X |
| 3,624,437 | 11/1971 | Hoyler | 310/53 X |
| 3,684,907 | 8/1972 | Hinachi et al. | 310/155 |
| 3,906,267 | 9/1975 | Coupin | 310/268 X |

Primary Examiner—Donovan F. Duggan
Attorney, Agent, or Firm—Fay I. Konzem; John H. Lynn; Albert J. Miller

[57] ABSTRACT

A rotating electrical machine having a self-supporting, ironless stator assembly.

22 Claims, 7 Drawing Figures

ROTATING ELECTRICAL MACHINE

BACKGROUND OF THE INVENTION

1. Field of the Invention

This invention relates to rotating electrical permanent magnet machines, and more particularly to a stator assembly for an electrical machine.

2. Description of the Prior Art

Thermal characteristics play an important part in the operation of motors and generators because temperature rise limits a machine's rating and therefore its applications. Temperature rise in an electrical machine is caused by the heat produced by various energy losses. One source of energy loss (and therefore temperature rise) is the stator iron. In general, the primary purpose for the stator iron is to reduce the reluctance of the magnetic circuit to obtain acceptable excitation losses. A secondary purpose is to position and support the stator conductors. Unfortunately, this results in enclosure of the conductors so that they are not directly exposed to the flow of cooling air. Thus the stator iron causes stator temperature to rise by interference with heat transfer and by contributing to the heat in the stator.

SUMMARY OF THE INVENTION

The rotating electrical machine in accordance with the invention, consists of an annular-shaped ironless stator assembly which is self-supported in the machine housing, thereby allowing most of the stator assembly surface area to be directly exposed to cooling air. The rotating electrical machine also includes a rotor assembly which rotates within the machine housing and which provides magnetic flux linkage with the stator assembly.

The features of the present invention which are believed to be novel are set forth with particularity in the appended claims. The present invention, both as to its organization and manner of operation, may be understood best by reference to the following description, taken in connection with the accompanying drawings.

DETAILED DESCRIPTION OF THE PREFERRED EMBODIMENT

Figure 1:
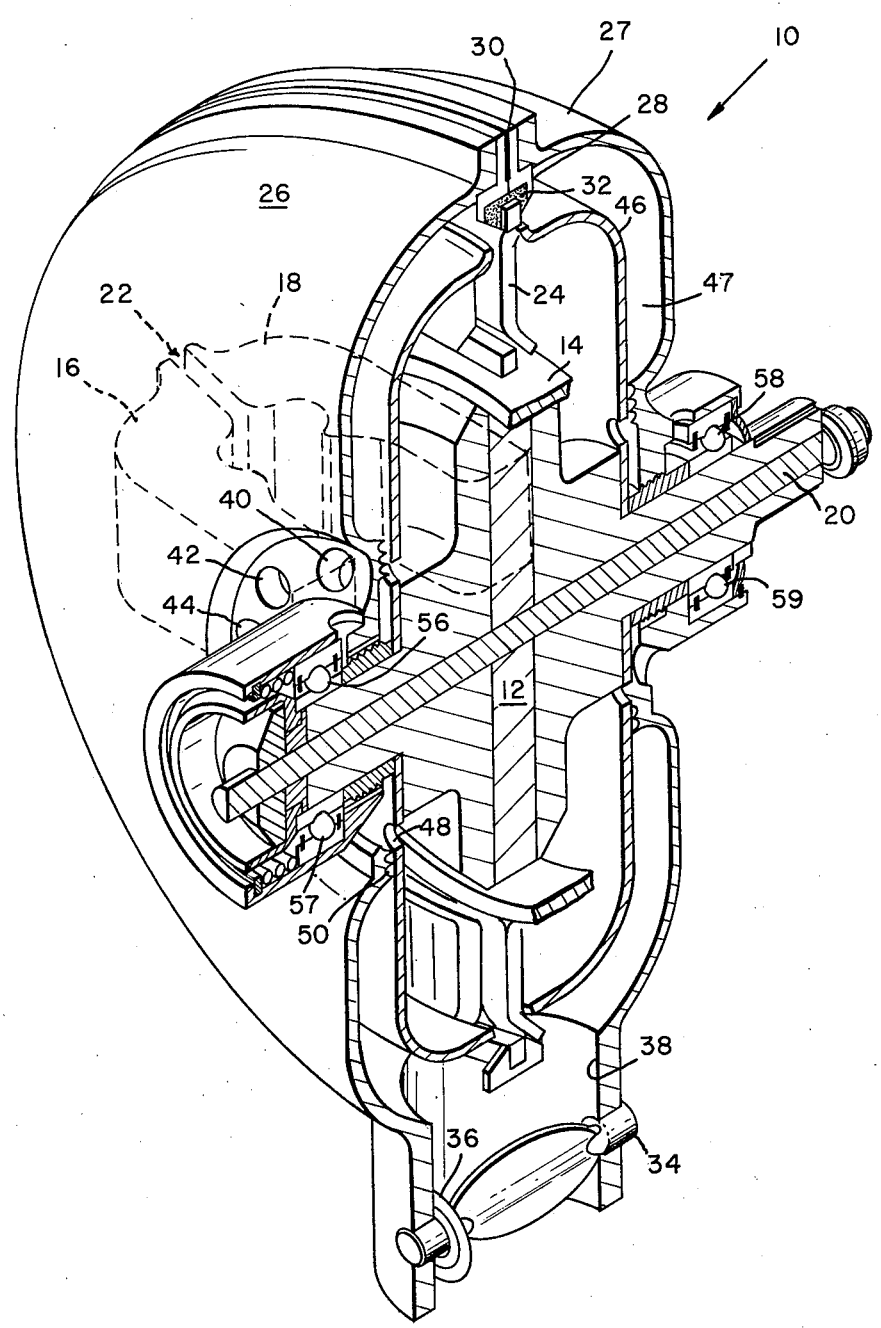
FIG. 1 is a perspective view of a rotating electrical machine according to a first embodiment of the invention.
Figure 2:
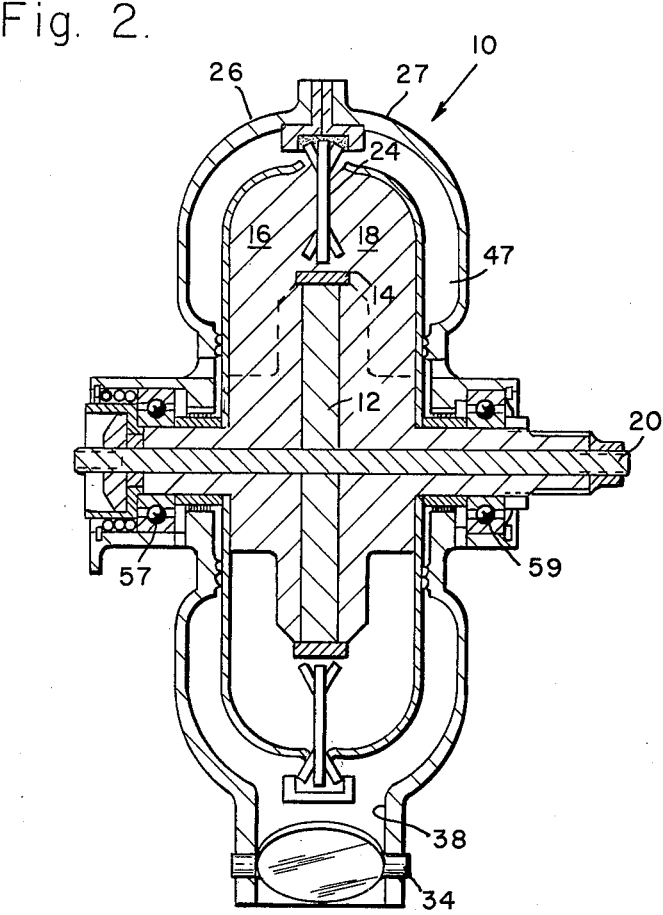
FIG. 2 is an axial cross-sectional view of a rotating electrical permanent magnet machine according to a first embodiment of the invention.

Referring now to FIGS. 1 and 2, the electrical permanent magnet machine 10 of the present invention includes a disk-shaped axially polarized permanent magnet 12 for providing field excitation. The permanent magnet 12 could be of any type permanent magnet material, one such material being rare-earth cobalt. A non-magnetic retaining hoop 14 totally supports the magnet 12 in compression so that the magnet's integrity is unaffected by structural flaws that are characteristic of the permanent magnet material.

Figure 3:
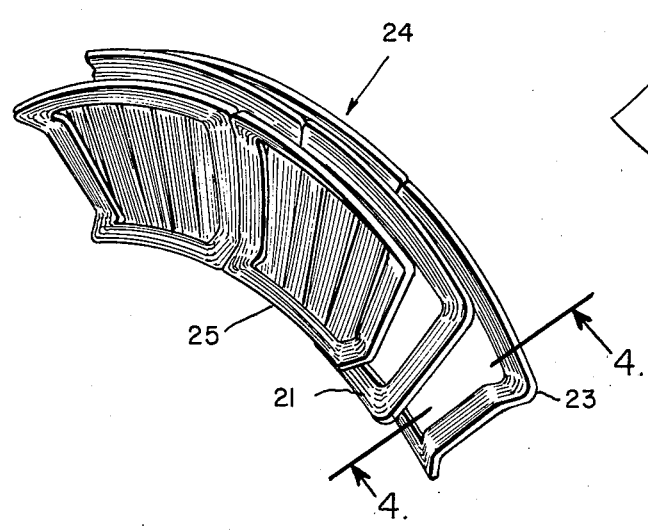
FIG. 3 depicts a portion of the coils of the stator assembly of the rotating electrical machine of FIG. 1.

A rotor assembly consists of a front rotor member 19 (FIG. 5) and an identical rear rotor assembly (not shown) and the magnet 12. Each of these rotor members consists of a plurality of similarly-shaped pole bodies at equal displacements. Pole bodies 16 and 18 are shown in FIGS. 1 and 2. A non-magnetic tie or tension bolt 20 retains the magnet 12 and the pole bodies. The tie bolt 20 is particularly useful at high speeds for holding the magnet and pole bodies together but is unnecessary at lower speeds. An air gap 22 exists between the pole bodies 16 and 18. The additional pole bodies (not shown) also have a similarly shaped air gaps. As the pole bodies 16 and 18 rotate about the center axis, the flux linkage through a stator assembly 24 changes, thus inducing an electromotive force (e.m.f.) in stator coils 21, 23 and 25 (FIG. 3). The stator assembly 24 is attached to two housing shells 26 and 27 by means of a stator assembly supporting structure or clamp consisting of sections 28 and 30. The stator coils 21, 23 and 25 (FIG. 3) are affixed to the clamp sections 28 and 30 by means of a dielectric molding or adhesive compound 32. In place of the two clamp pieces 28 and 30 a single clamp could be used. The housing shells 26 and 27 in the preferred embodiment are cast stainless steel to provide rotor fragment containment in the event of a destructive overspeed of the rotor. Other materials, non-ferrous or plastic, could be used for the housing shells 26 and 27 if external containment means is available.

The pole bodies 16 and 18 provide centrifugal fan action as they rotate. This rotation cools the stator assembly 24, but incurs pumping loss. Pumping loss is regulated automatically to the stator cooling requirements by a butterfly valve 34. The valve 34 is thermally actuated by a bimetal coil actuator 36 in an exit air duct 38 to control the air flow through the machine 10. The actuator 36 senses the air temperature in the air exit duct 38 and automatically regulates the valve 34 to allow more or less air flow through the machine 10 according to cooling needs. The valve 34 is very useful to minimize pumping loss for machines which operate over a wide speed range. For constant speed machines or for machines that operate over a narrow speed range such a valve is not necessary.

The machine housing shells 26 and 27 contain air inlet holes 40, 42 and 44 to provide air circulation through the machine 10. A windage shroud 46 encloses the permanent magnet 12 and the pole bodies 16 and 18 to enhance air flow over the stator assembly 24 and to reduce air friction loss. The windage shroud 46 has a plurality of inlet air holes 48. Air is drawn in through these holes 48 and past the stator assembly 24 to cool it. The hot air is then exhausted to the outer cavity 47 and out the air exit duct 38. A plurality of seals 50 are located on the shells 26 and 27 to prevent recirculation of the hot exit air into the inlet holes 48.

The tie bolt 20 extends through the pole bodies and the magnet 12 to form the rotor assembly 19 which is supported in the housing shells 26 and 27 by bearings 57 and 59. A retainer nut 55 secures the tie bolt 20 in place, and bearings 57 and 59 align the rotor assembly 19 in a stabilized manner.

Figure 4:
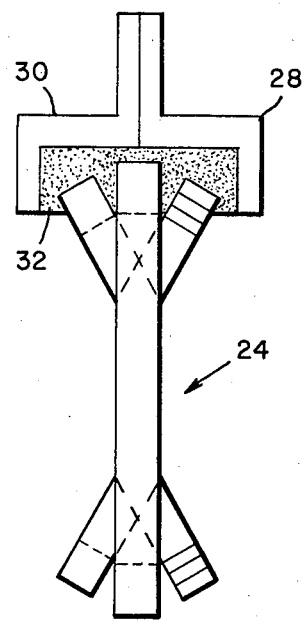
FIG. 4 is a section taken on line 4—4 of FIG. 3, showing the stator coils assembled with the clamp pieces.

The stator assembly 24 is shown in greater detail in FIGS. 3 and 4; FIG. 3 showing a perspective view of the stator coil arrangement and FIG. 4 showing a section taken on line 4—4 of FIG. 3. The stator assembly 24 consists of three types of coils typified by the coils 21, 23 and 25 which are wound of copper ribbon conductors. The coil 21 is flat, whereas the coils 23 and 25 are formed, the formed sides of the conductors 23 facing the opposite direction from the formed sides of the conductors 25. Forming the three sets of coils 21, 23 and 25 in this manner allows them to compactly fit together as a structural unit. The conductors of the coils 21, 23 and 25 are flat, insulated ribbon conductors oriented with their maximum dimension parallel to the flow of flux so as to minimize eddy current loss. The ribbon conductors provide the desired rigidity to the coils 21, 23 and 25, which are bonded together. The ribbon conductors provide superior rigidity, better heat transfer, better space utilization and lower eddy current loss as compared to round wire, mesh-wound coils or substrate-mounted, printed circuit conductors.

The inherent rigidity and structural properties of the ribbon conductors provide the primary structure of the stator assembly 24. The packing factor for ribbon conductors is about twice that of round conductors. That fact coupled with the elimination of iron teeth nearly quadruples the space available for the stator copper as compared to conventional machines.

Since the stator conductors of different phases are pre-formed and not intertwined, phase-to-phase faults are unlikely.

Also, with the elimination of stator iron, the possibility of ground faults is virtually eliminated.

Several advantages to the stator assembly 24 exist since the stator coils 21, 23 and 25 consist of copper and stator iron is totally lacking. The interpolar leakage flux, which generates a negative electromotive force (e.m.f.) component opposing the e.m.f. of the main flux is very low. Further, the elimination of stator teeth substantially reduces the stator leakage reactance. As compared to conventional machines, the demagnetizing effect of the stator load current is reduced due to the large reluctances of the stator gap and the magnet.

Because the stator assembly 24 is totally self-supported within the active air gap region 22, no extraneous materials adversely affecting the magnetic path are used. The passive supporting structure consisting of sections 28 and 30 is external to the active region, i.e. to the air gap 22.

Another advantage of the stator assembly 24 is that since virtually all of the surface area of the stator assembly 24 is directly exposed to the flow of cooling air, the temperature rise within the copper is minimized. There are no obstructions around the stator assembly 24 to inhibit heat transfer from the stator assembly 24 to the air. This permits operation at high current density to reduce the amount of copper required in the stator and consequent reduction of the air gap 22 dimension and the size of the permanent magnet 12.

Figure 5:
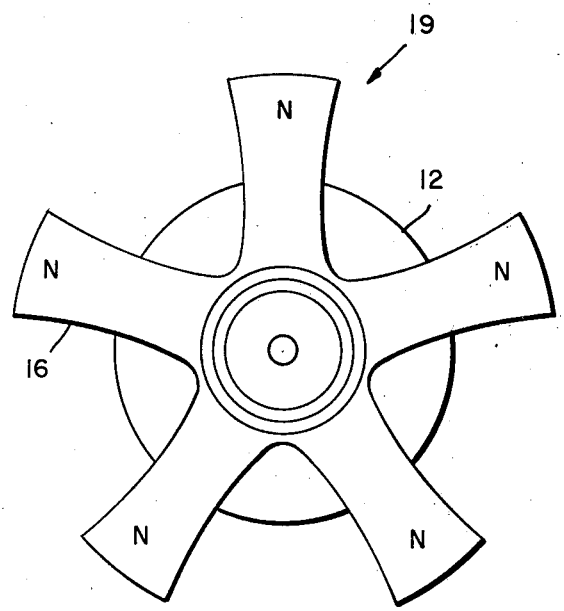
FIG. 5 is a front view of the forward rotor-member of the electrical machine of FIG. 1.

FIG. 5 depicts a front view of the front rotor member 19 of the machine 10. Any number of pole bodies may be used, but the number must be equal to the number of stator pole pairs. The rotor assembly rotates about the rotor axis within the housing shells 26 and 27.

Figure 6:
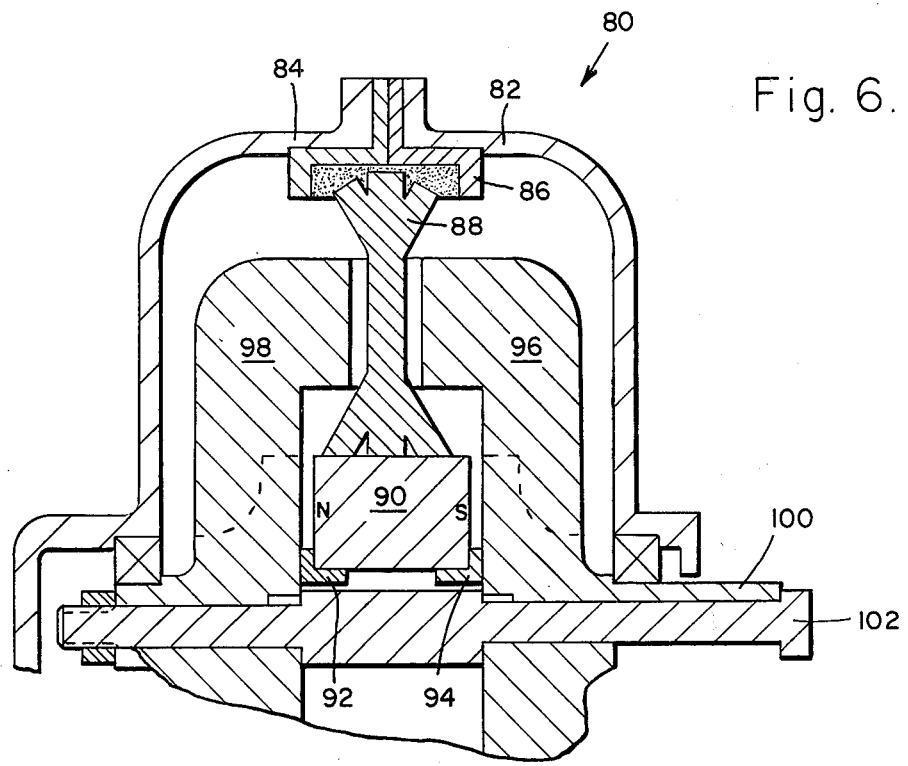
FIG. 6 is an axial section through an electrical permanent magnet machine according to a second embodiment of the invention.

Another embodiment of the present invention is illustrated in FIG. 6. The electrical permanent magnet machine 80 consists of housing shells 82 and 84 which fit together to form the housing for the machine components and which hold a stator assembly supporting structure 86 in place. A stator assembly 88 is retained at its outer periphery by supporting structure 86. The inner periphery of the stator 88 supports and is affixed to a non-rotating permanent magnet 90. Bushings 92 and 94 stabilize axial position of the non-rotating permanent magnet 90 between rotating rotor poles 96 and 98. A rotor shaft 100 rotates the poles 96 and 98 along with a plurality of identical poles (not shown) which radiate from a rotor shaft 100. A non-magnetic tie bolt 102 ties the rotor poles together.

The rotor shaft electrical permanent magnet machine 80 can operate at very high speeds since rotational speed is not constrained by the poor structural properties of the permanent magnet because in this embodiment the permanent magnet 90 is held stationary.

Figure 7:
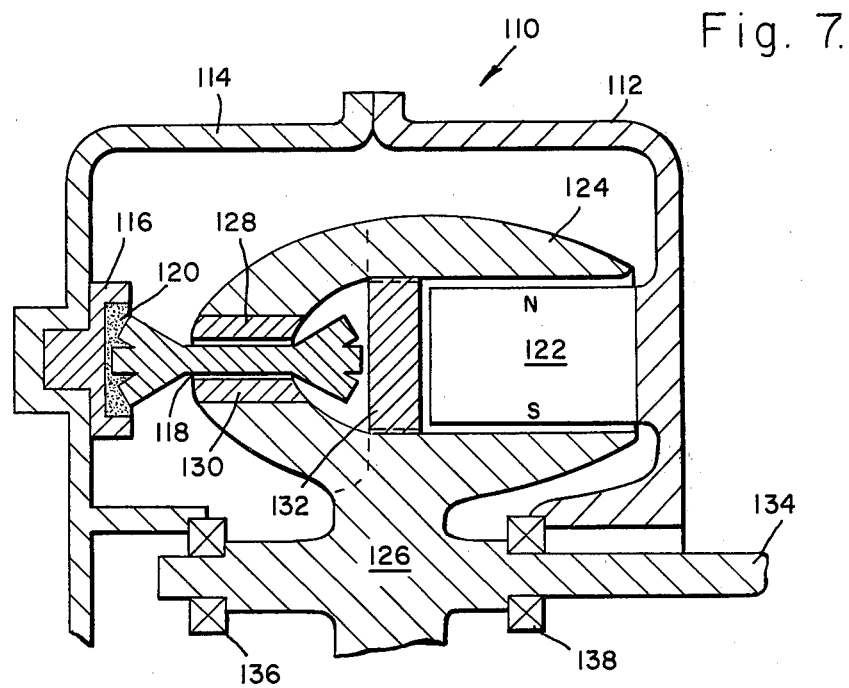
FIG. 7 is an axial section through an electrical permanent magnet machine according to a third embodiment of the invention.

FIG. 7 is a section through a radial gap electrical permanent magnet machine 110, which is a third embodiment of the invention. The machine 110 consists of two housing shells 112 and 114; and a clamp 116 is inserted into and affixed to the housing shell 114. A stator assembly 118 is securely joined to the clamp 116 by means of a dielectric molding compound 120. A non-rotating tubular-shaped permanent magnet 122 is affixed to the inner surface of the housing shell 114. A pole body 124 is located on the outer side of the stator 118 and the permanent magnet 122 and another pole body 126 is located on the inner side of the stator and magnet. The pole body 124 has a removable section 128 for facilitating assembly of the machine 110. The pole body 126 has a similar removable section 130. A non-magnetic support ring 132 joins the pole bodies 124 and 126. The ring 132 can be affixed to the pole bodies by either welding, bolting or HIP bonding. A drive shaft 134 rotates the pole bodies 124 and 126 along with a plurality of identical pole bodies (not shown), which are similarly connected. Bearings 136 and 138 align the drive shaft 134 and pole bodies in a stabilizing manner.

Although the devices which have been just described appear to afford the greater advantages for implementing the invention, it will be understood that various modifications may be made, thereto without going beyond the scope of the invention, it being possible to replace certain elements by other elements capable of fulfilling the same technical functions therein.

I claim:

1. A rotating electrical machine, comprising:
a machine housing;
a rotor assembly rotatably mounted with said machine housing for providing magnetic flux, said rotor assembly comprising a plurality of pairs of oppositely-polarized permanent magnetic poles spaced apart to form a plurality of air gaps therebetween, said pairs of oppositely-polarized permanent magnetic poles forming magnetic fields within said air gaps, said magnetic fields all being in the same direction; and
an ironless stator assembly, said ironless stator assembly comprising a plurality of multi-turn coils bonded together to form an annular shape having an outer circumference, said ironless stator assembly being positioned within said air gaps to provide magnetic flux linkage between said rotor assembly and said ironless stator assembly, said ironless stator assembly including means for connecting said outer circumference thereof to said machine housing to support said ironless stator assembly therewithin, said connecting means being the only supporting connection to said said stator assembly.

2. A machine as recited in claim 1, wherein said connecting means comprises a supporting structure having a molding compound applied between said supporting structure and said stator assembly.

3. A machine as recited in claim 1, wherein said annularly shaped stator assembly comprises a plurality of formed ribbon conductors.

4. A machine as recited in claim 3, wherein said conductors are copper.

5. A machine as recited in claim 1, wherein said housing is a non-ferrous material.

6. A motor, comprising:
a motor housing;
a rotor assembly rotatably mounted within said motor housing, said rotor assembly comprising a disk-shaped permanent magnet for providing field excitation, said disk-shaped permanent magnet being axially polarized, whereby opposite planar surfaces thereof have opposite magnetic polarities, a non-magnetic retaining hoop for compressing the circumference of said disk-shaped permanent magnet to maintain the structural integrity thereof, and a plurality of pairs of oppositely polarized magnetic pole bodies extending radially outward from said disk-shaped permanent magnet to form a plurality of air gaps, said plurality of air gaps being radially spaced apart from the circumference of said disk-shaped permanent magnet; and
an annulary-shaped ironless stator assembly having an outer circumference, said stator assembly being positioned within said air gaps to provide magnetic flux linkage between said rotor assembly and said stator assembly, said stator assembly including means for securing only the outer circumference thereof to said motor housing, said stator assembly further including three separate coils for three-phase operation.

7. A motor as recited in claim 6, wherein said annularly shaped stator assembly comprises a plurality of copper formed ribbon conductors.

8. A motor as recited in claim 6, further including a windage shroud located within said motor housing and around said pole bodies and said permanent magnet, said windage shroud having a plurality of air inlet holes and an opening in which said stator assembly is positioned;
said motor housing having a plurality of air inlet holes and an air exit duct; and
a butterfly valve located within said air exit duct for controlling the air flow through the motor.

9. An electric machine, comprising:
a tie bolt;
a disk-shaped permanent magnet having an outer circumference, said disk-shaped permanent magnet being rotatably mounted on said tie bolt;
a first plurality of magnetic pole bodies located adjacent one planar side of said disk-shaped permanent magnet and mounted on said tie bolt, said first plurality of magnetic pole bodies having the same polarity as the adjacent side of said disk-shaped permanent magnet;
a second plurality of magnetic pole bodies located adjacent the other planar side of said disk-shaped permanent magnet and mounted on said tie bolt, said second plurality of magnetic pole bodies being opposite in polarity to said first plurality of magnetic pole bodies, said first and second pluralities of magnetic pole bodies being aligned in pairs to form a plurality of air gaps radially spaced apart from the circumference of said disk-shaped permanent magnet;
a support structure connected to said tie bolt; and
an annular-shaped ironless stator assembly having an outer circumference connected to said support structure, said stator assembly being positioned within said plurality of air gaps, said stator asembly including three separate coils for three-phase operation.

10. A machine as recited in claim 9, wherein said permanent magnet comprises a rare-earth cobalt material.

11. A machine as recited in claim 9, wherein said annularly shaped stator assembly comprises a plurality of formed copper ribbon conductors.

12. A machine as recited in claim 10, wherein said permanent magnet is radially polarized.

13. A rotating electrical machine, comprising;
a machine housing;
a tie bolt connected to said machine housing to maintain the structural integrity thereof;
a disk shaped permanent magnet affixed to said tie bolt;
a plurality of permanent magnetic pole bodies rotatably mounted on said tie bolt adjacent the sides of said disk-shaped magnet, said plurality of pole bodies being arranged in pairs to form a plurality of air gaps between opposite magnetic poles;
an annularly shaped ironless stator assembly having an outer circumference and an inner diameter, said outer circumference being connected to said machine housing, said inner diameter being connected to said disk-shaped permanent magnet, said stator assembly including a plurality of conductors positioned within said air gaps; and
a pair of bushings connected to said permanent magnet for stabilizing the axial position of said permanent magnet between said magnetic pole bodies.

14. A machine as recited in claim 13, wherein said permanent magnet comprises an axially polarized rare-earth cobalt material.

15. A machine as recited in claim 13, wherein said stator assembly comprises formed copper ribbon conductors.

16. A rotating electrical machine comprising:
first and second housing shells in facing relationships to one another which are attached together along their respective edges, said shells having inner and outer surfaces, and said shells together forming a housing space;
a shaft positioned within said housing shells;
a stationary annularly shaped permanent magnet having first and second sides, said first side affixed to the inner surface of said first housing shell;
an annularly shaped ironless stator assembly having an outer circumference and an inner diameter;
a support structure for retaining said stator assembly in said housing;
a molding compound applied between said supporting structure and said stator assembly for affixing said stator to said supporting structure;
a first set of pole bodies having an inner diameter and an outer diameter, said inner diameter mounted on said shaft and said outer diameter positioned alongside said stator assembly and said permanent magnet; and a second set of pole bodies having a support connecting the second set to said first set of pole bodies, said second set of pole bodies positioned alongside said outer diameter of said stator assembly and said permanent magnet.

17. A machine as recited in claim 16, wherein said permanent magnet comprises a radially polarized rare-earth cobalt material.

18. A rotating electrical machine comprising:
first and second housing shells in facing relationships to one another which are attached together along their respective edges, said shells having inner and outer surfaces, and said shells together forming a housing space;
a tie bolt within said housing shells;
a stationary annular shaped permanent magnet having first and second sides, said first side affixed to the inner surface of said first housing shell;
an annularly shaped ironless stator assembly;
a support structure attached to the inner surface of said second housing shell for retaining said stator assembly in said second housing shell;
a molding compound applied between said supporting structure and said stator assembly for affixing said stator to said supporting structure; and
first and second sets of pole bodies oppositely disposed about said stator assembly and said permanent magnet, said first set of pole bodies and said second set of pole bodies having a support for connecting the two sets of pole bodies, and
said second set of pole bodies mounted on said tie bolt.

19. A method of cooling the stator assembly of a motor/generator machine comprising the steps of:
providing a machine housing;
providing an annularly shaped ironless stator assembly;
securing the circumference only of the stator assembly to the machine housing;
providing air inlet holes in the machine housing for cooling air to enter the machine;
separating the incoming cooling air from the circulated heated air; and
exhausting the heated air from the machine housing.

20. The method of claim 19, in which the step of exhausting the heated air comprises regulating the air flow in the machine housing.

21. A method of cooling the stator of a rotating electrical machine comprising the steps of:
providing a machine housing;
providing an annularly shaped ironless stator assembly;
securing the circumference only of the stator assembly to the machine housing;
drawing air into the machine housing;
separating the cool incoming air from the heated circulated air; and
exhausting the heated air from the machine housing.

22. A rotating electrical machine, comprising;
a housing;
an annularly-shaped permanent magnet affixed to said housing, said annularly-shaped permanent magnet having inner and outer portions having opposite magnetic polarizations;
an annularly-shaped ironless stator assembly affixed to said housing in coaxial alignment with said annularly-shaped permanent magnet, said stator assembly having a first surface and a second surface;
a shaft rotatably mounted within said housing, said shaft being in coaxial alignment with said annularly-shaped permanent magnet and said annularly-shaped stator assembly;
a first set of pole bodies connected to said shaft, each of said first set of pole bodies having a first portion adjacent the first surface of said stator assembly and a second portion adjacent the inner portion of said annularly-shaped permanent magnet;
support means extending from each of said first set of pole bodies; and
a second set of pole bodies each being connected to said support means, each of said second set of pole bodies having a first portion adjacent the second surface of said annularly-shaped stator assembly and a second portion adjacent the outer portion of said annularly-shaped permanent magnet.

* * * * *